(12) United States Patent
Mattia et al.

(10) Patent No.: US 7,285,169 B2
(45) Date of Patent: Oct. 23, 2007

(54) APPARATUS AND METHOD FOR APPLYING A TIRE DRESSING FLUID TO A TIRE SURFACE

(75) Inventors: Paul Mattia, Prior Lake, MN (US); Kyle F. Schindel, Hagerstown, MD (US); Brian Chute, Inver Grove Heights, MN (US)

(73) Assignee: Ecolab Inc., St. Paul, MN (US)

( * ) Notice: Subject to any disclaimer, the term of this patent is extended or adjusted under 35 U.S.C. 154(b) by 0 days.

(21) Appl. No.: 11/188,334

(22) Filed: Jul. 25, 2005

(65) Prior Publication Data

US 2005/0255247 A1 Nov. 17, 2005

Related U.S. Application Data

(60) Division of application No. 10/379,399, filed on Mar. 3, 2003, now Pat. No. 6,939,405, which is a continuation-in-part of application No. 10/087,203, filed on Mar. 1, 2002, now Pat. No. 6,660,335.

(51) Int. Cl.
*B05C 1/02* (2006.01)

(52) U.S. Cl. ............ 118/264; 118/265; 118/266; 118/304; 15/53.4; 15/97.3; 134/123

(58) Field of Classification Search ............ 118/264, 118/265, 266, 304; 15/53.4, 97.3; 134/123
See application file for complete search history.

(56) References Cited

U.S. PATENT DOCUMENTS

| | | | |
|---|---|---|---|
| 3,208,089 A | 9/1965 | Vani | |
| 3,305,886 A | 2/1967 | Fricke | |
| 3,345,666 A | 10/1967 | Hanna et al. | |
| 3,346,895 A | 10/1967 | Consolo | |
| 3,403,417 A | 10/1968 | Hanna et al. | |
| 3,628,212 A | 12/1971 | Van Brakel | |
| 3,822,431 A | 7/1974 | Van Brakel | |
| 4,020,518 A | 5/1977 | Harding et al. | |
| 4,203,857 A | 5/1980 | Dugan | |

(Continued)

FOREIGN PATENT DOCUMENTS

JP 62-6854 * 1/1987

OTHER PUBLICATIONS

"Advertisement for Sonny's, The Car Wash Factory", *Professional Carwashing & Detailing*, vol. 25, No. 11, 2 pages (Nov. 2001).

(Continued)

*Primary Examiner*—Laura Edwards
(74) *Attorney, Agent, or Firm*—Kinney & Lange, P.A.

(57) ABSTRACT

An apparatus for applying a tire dressing fluid to a tire surface is provided. The apparatus includes a tire engagement arm having an applicator manifold and leveling pad. The applicator manifold has an opening for receiving a tire dressing fluid and a plurality of openings for dispensing the tire dressing fluid directly onto the tire surface. The leveling pad is provided for engaging the tire surface and spreading the tire dressing fluid over the tire surface. A method for applying a tire dressing fluid onto a tire surface is provided.

6 Claims, 15 Drawing Sheets

U.S. PATENT DOCUMENTS

| | | |
|---|---|---|
| 4,312,090 A | 1/1982 | Durcan |
| 4,694,523 A | 9/1987 | Van Brakel |
| 4,958,587 A | 9/1990 | Fogal et al. |
| 4,985,957 A | 1/1991 | Belanger et al. |
| 5,052,629 A | 10/1991 | Belanger et al. |
| 5,123,136 A | 6/1992 | Belanger et al. |
| 5,125,981 A | 6/1992 | Belanger et al. |
| 5,134,742 A | 8/1992 | Ennis |
| 5,463,788 A | 11/1995 | Ennis |
| 6,048,583 A | 4/2000 | Waddell |
| 6,260,225 B1 | 7/2001 | Bowman |
| 6,383,295 B1 | 5/2002 | Frederick et al. |
| 6,461,429 B1 | 10/2002 | Gorra |
| 6,461,685 B2 | 10/2002 | Gorra |
| 6,602,835 B2 * | 8/2003 | Schmeida et al. .......... 510/202 |
| 6,660,335 B2 | 12/2003 | Mattia et al. |
| 6,807,973 B2 * | 10/2004 | Fratello et al. ............. 134/123 |
| 6,936,104 B2 * | 8/2005 | Gorra ........................ 118/264 |
| 2001/0037765 A1 | 11/2001 | Gorra |
| 2002/0192389 A1 | 12/2002 | Gorra |

OTHER PUBLICATIONS

"Sonny's™ SonnysDirect.com—The Car Wash Factory," http://www.sonnysdirect.com/products/equipment/components/components2.asp, last updated Feb. 25, 2002, 1 page.

"Automatic Carwashing—Is foam the answer?", 3 pages, date unknown.

\* cited by examiner

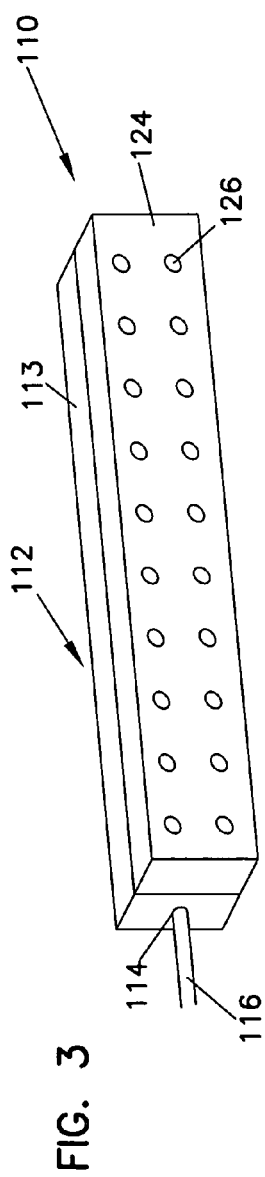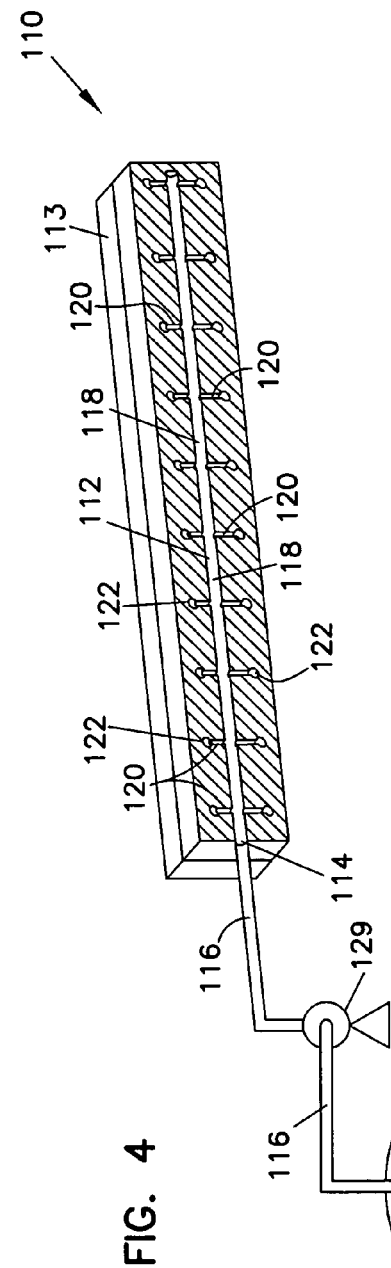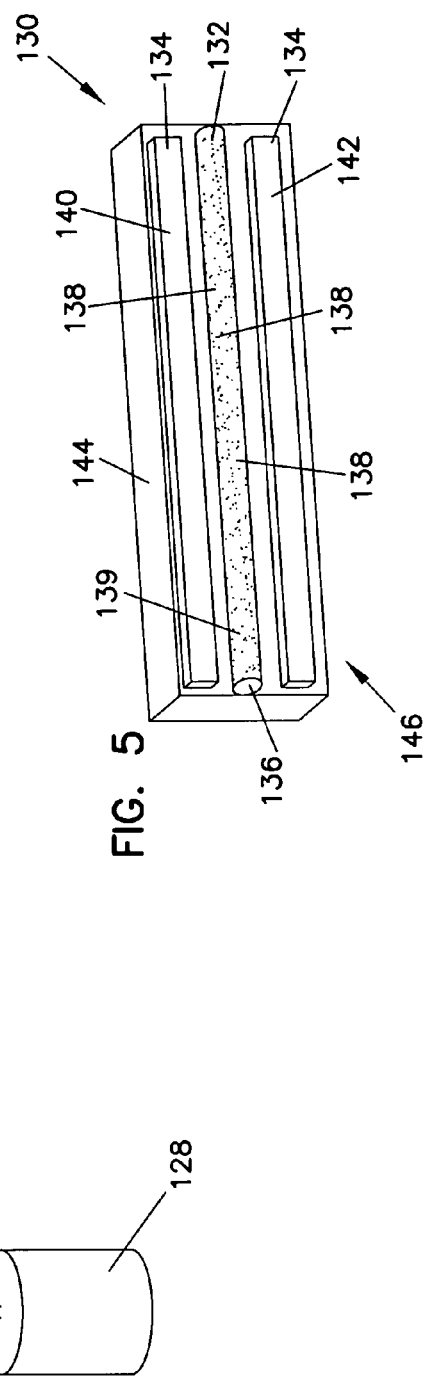

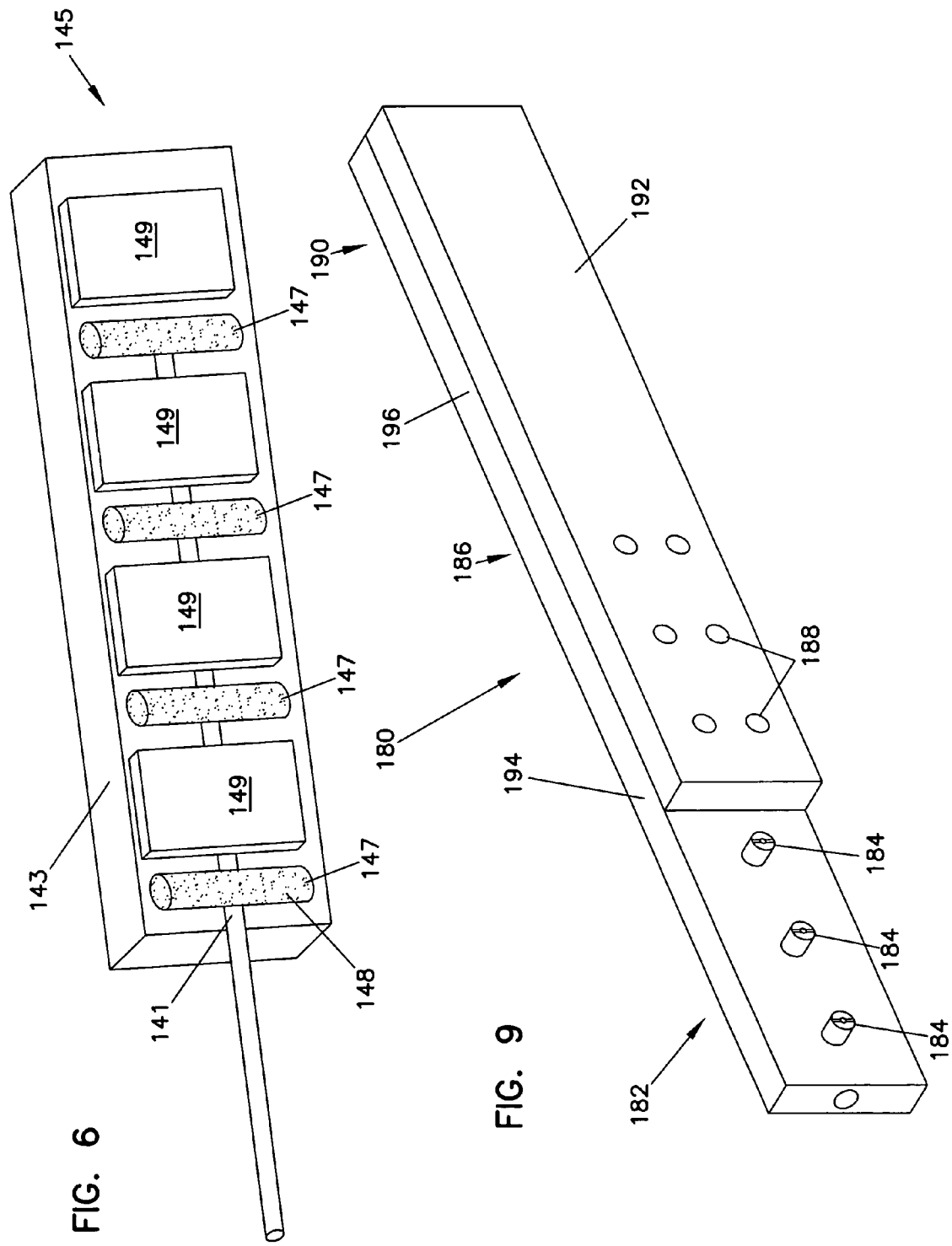

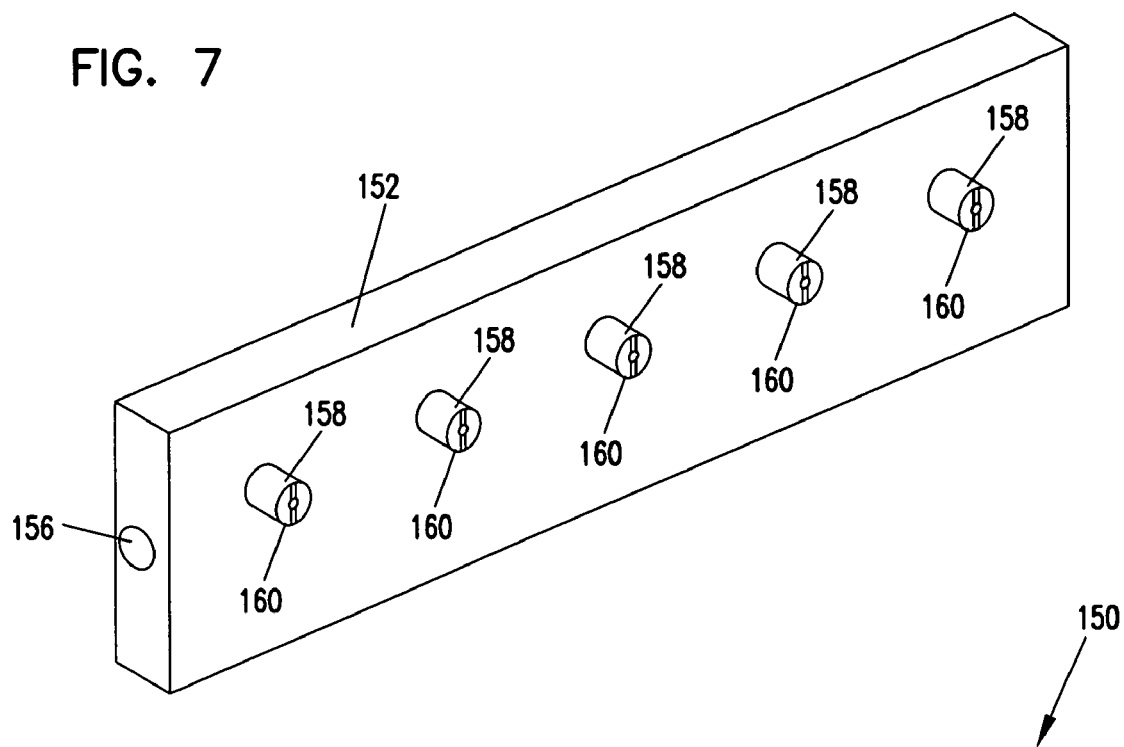
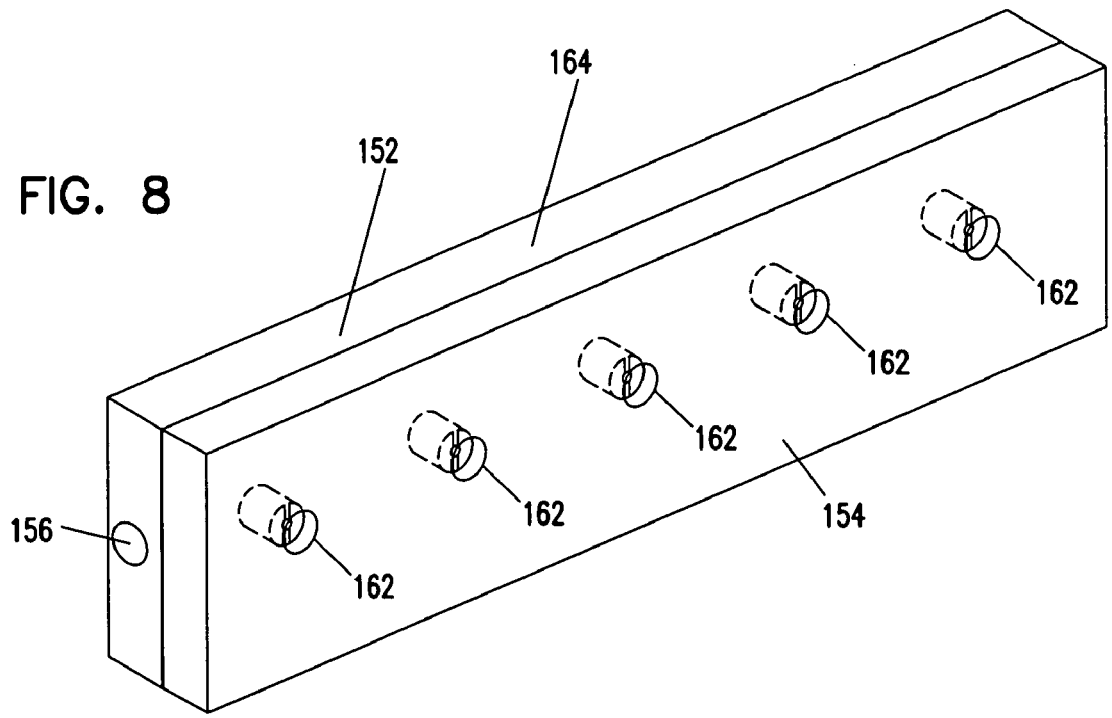

APPARATUS AND METHOD FOR APPLYING A TIRE DRESSING FLUID TO A TIRE SURFACE

CROSS REFERENCE TO RELATED APPLICATIONS

This application is a divisional of U.S. application Ser. No. 10/379,399 that was filed with the United States Patent and Trademark Office on Mar. 3, 2003, now U.S. Pat. No. 6,939,405. U.S. application Ser. No. 10/379,399 is a continuation-in-part of U.S. application Ser. No. 10/087,203 that was filed with the United States Patent and Trademark Office on Mar. 1, 2002, and that issued as U.S. Pat. No. 6,660,335 on Dec. 9, 2003. U.S. application Ser. No. 10/379,399 and U.S. application Ser. No. 10/087,203 are incorporated herein by reference.

FIELD OF THE INVENTION

The invention relates to an apparatus for applying a tire dressing fluid to a tire surface and to a method for applying a tire dressing fluid to a tire surface.

BACKGROUND OF THE INVENTION

Automated vehicle washing facilities are fairly common. People utilizing automated vehicle washing facilities often desire to have a dressing fluid applied to the tires of their vehicle to provide the tires with a shiny appearance. The dressing fluid can be applied manually. In general, after the vehicle and tires have been cleaned, a worker at the automated vehicle washing facility manually applies the dressing fluid to the vehicle tires. In certain facilities, the worker will dip a sponge into a container of the dressing fluid, and then wipe the sponge over the sidewalls of the vehicle tires.

There have been attempts to automate the application of dressing fluid to vehicle tires. Exemplary approaches are described by U.S. Pat. No. 6,260,225 to Bowman and U.S. patent application Publication No. U.S. 2001/0037765 to Gorra.

SUMMARY OF THE INVENTION

An apparatus for applying a tire dressing fluid to a tire surface is provided according to the invention. The apparatus includes a tire engagement arm having an applicator manifold and leveling pad. The applicator manifold has an opening for receiving a tire dressing fluid and a plurality of openings for dispensing the tire dressing fluid onto the tire surface. The leveling pad is provided for engaging the tire surface and spreading the tire dressing fluid over the tire surface. The apparatus additionally includes at least two swing arms and an anchor. The at least two swing arms have a first end rotatably attached to the tire engagement arm, and a second end rotatably attached to the anchor.

A method for applying a tire dressing fluid to a tire surface is provided according to the invention. The method includes steps of applying the tire dressing fluid from an applicator manifold onto the tire surface and leveling the tire dressing fluid applied to the tire surface by moving the tire surface relative to a leveling pad. The applicator manifold and the leveling pad can be provided as part of a tire engagement arm that is provided as part of an apparatus in a vehicle washing facility. As vehicles pass through the vehicle washing facility, rotation of the vehicle tires causes movement of the tire surface across the leveling pad.

An alternative apparatus for applying a tire dressing fluid to a tire surface is provided according to the invention. The apparatus includes an applicator manifold anchored in place in an automated vehicle washing facility. It should be understood that the phrase "anchored in place" refers to the relative stationary location of the applicator manifold. In general, the applicator manifold is not one that is intended to be hand held and manipulated in an operator's hands. The applicator manifold includes an opening for receiving the tire dressing fluid and a plurality of openings for dispensing the tire dressing fluid onto the tire surface. The apparatus includes a pressurized line for delivering tire dressing fluid from a source of tire dressing fluid to the applicator manifold as a compressed air and tire dressing fluid mixture, and a valve for controlling the flow of the compressed air and tire dressing fluid mixture.

An alternative method for applying a tire dressing fluid to a tire surface is provided according to the invention. The method includes step of applying a release agent to a wheel, spraying a tire dressing fluid onto a tire surface of a tire mounted to the wheel, and rinsing the release agent from the wheel.

BRIEF DESCRIPTION OF THE DRAWINGS

FIG. 3 is a diagrammatic view of a tire engagement arm according to the principles of the present invention.

FIG. 4 is a diagrammatic view of the back side of the tire engagement arm of FIG. 3.

FIG. 5 is a diagrammatic view of an alternative embodiment of a tire engagement arm according to the principles of the present invention.

FIG. 6 is a diagrammatic view of an alternative embodiment of a tire engagement arm according to the principles of the present invention.

FIG. 7 is a diagrammatic view of an alternative embodiment of an applicator manifold according to the principles of the present invention.

FIG. 8 is a diagrammatic view of an alternative embodiment of a tire engagement arm including the applicator manifold of FIG. 7.

FIG. 9 is a diagrammatic view of an alternative embodiment of a tire engagement arm according to the principles of the present invention.

DETAILED DESCRIPTION OF THE INVENTION

The invention relates to an apparatus and a method for applying a tire dressing fluid to a tire surface. The tire surface can be provided as part of a tire attached to a motor vehicle that is cleaned in an automated tunnel washer. According to the invention, the tire dressing fluid can be applied directly to a tire surface. It should be understood that direct application of the tire dressing fluid refers to the application of the tire dressing fluid onto the tire surface from openings in an applicator manifold without an intermediary step of applying the tire dressing surface to another substrate, such as an open cell foam or a brush, that applies the tire dressing fluid onto the tire surface. When the application of the tire dressing fluid is characterized as a "direct application," it should be understood that the tire dressing fluid is not first applied to an open cell foam or to a brush that then applies the tire dressing fluid onto the tire surface. Instead, the tire dressing fluid is dispensed directly onto the surface of the tire. A leveling pad can then be used to level or more evenly cover the tire surface with the tire dressing fluid. It is believed that a desired level of dispensing control of the tire dressing fluid can be maintained by direct application of the tire dressing fluid to the tire surface.

Figure 1:
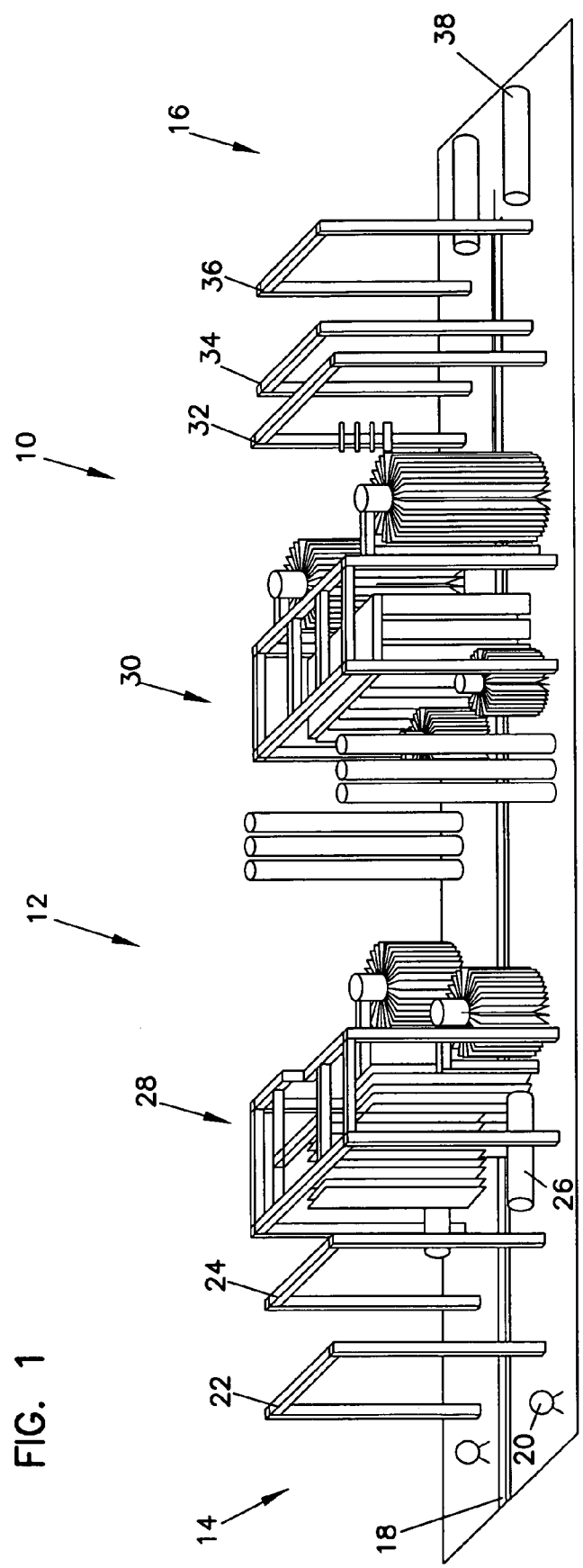
FIG. 1 is a diagrammatic view of a tunnel washing facility according to the principles of the present invention.

Referring to FIG. 1, a vehicle washing facility is shown at reference numeral 10. The vehicle washing facility 10 is a tunnel washer 12. A vehicle enters the tunnel washer 12 at the entry 14 and leaves at the exit 16. The vehicle is pulled through the tunnel washer 12 along the track 18.

Many commercial vehicle washing facilities offer a selection of different vehicle washing programs. A patron generally selects and pays for a desired vehicle washing program. Depending on the program selected, various components of the vehicle washing facility will be activated. For example, one patron may select a program that provides for the application of a sealant or protectant to the vehicle. Another patron may select a program according to the invention that applies a tire dressing composition to the tires of the vehicles. The general operation of the tunnel washer 12 is described but it should be understood that the various stations can be omitted and additional stations can be added to provide the desired washing program.

The tunnel washer 12 includes several stages that are conventionally found in commercial tunnel washers. Upon entry of the vehicle into the tunnel washer 12, the wheels of the vehicle can be sprayed with a detergent at the wheel sprayer 20. A first pre-soak arch 22 and a second pre-soak arch 24 can be provided to spray the vehicle with a detergent to loosen soil from the vehicle surface. A tire and wheel washer 26 can be provided for applying friction to the tires and the wheels to remove soil from the tires and the wheels. A foamer 28 can be provided for applying friction to the vehicle surface to help remove soil. A polisher 30 can be provided for rinsing the vehicle. A drying arch 32, sealant arch 34, and a protectant arch 36 can be provided for applying a drying agent, a sealant, and a protectant to the vehicle. According to the invention, a tire dressing applicator 38 can be provided for delivering a tire dressing fluid to the vehicle tires. The tire dressing applicator 38 can be provided near the end of the tunnel washer 12 so that the tire surface is generally clean and generally dry when the tire dressing fluid is applied to it.

Figure 2:
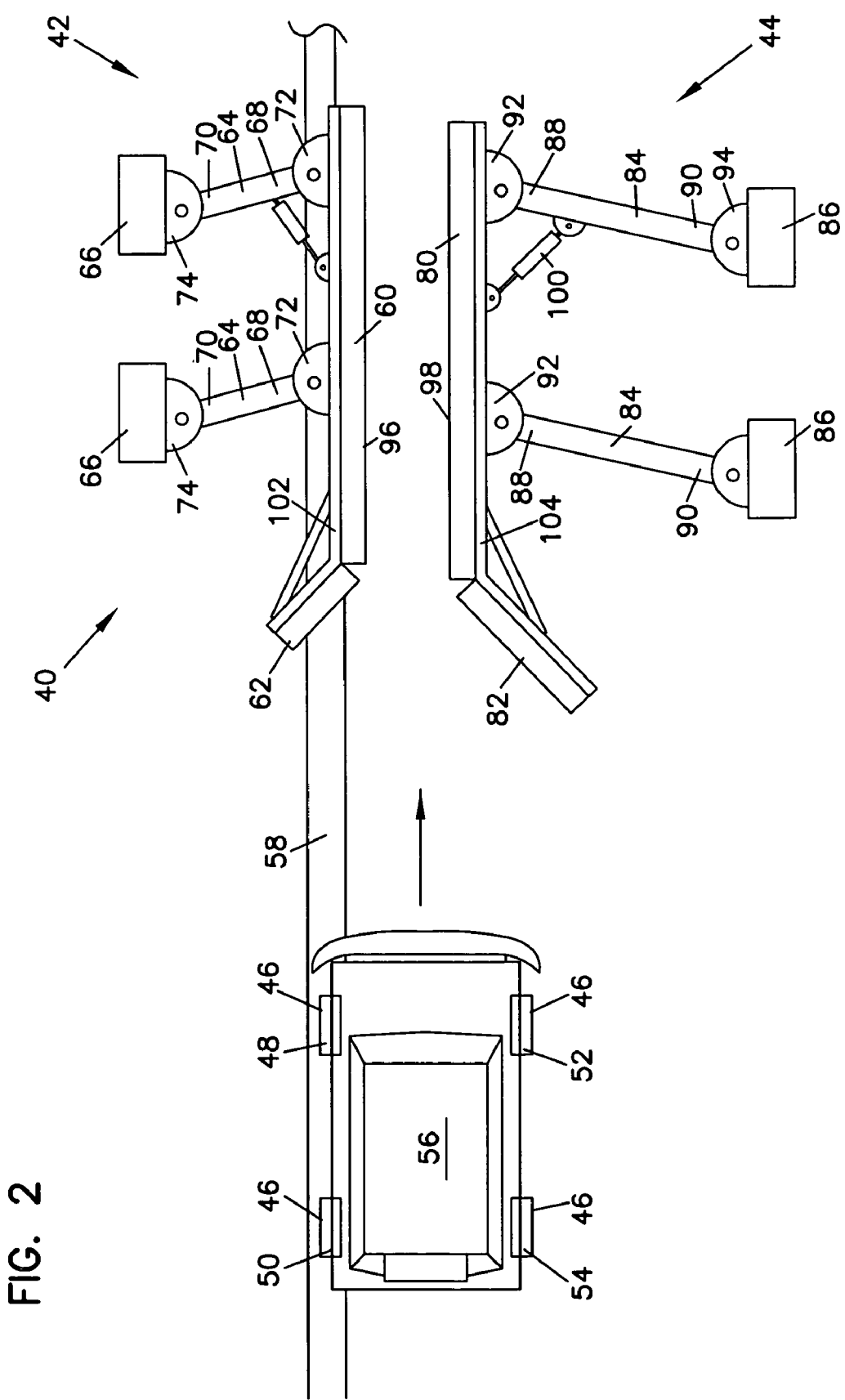
FIG. 2 is a diagrammatic view of a tire dressing apparatus according to the principles of the invention.

Now referring to FIG. 2, a tire dressing applicator according to the invention is shown at reference numeral 40. The tire dressing applicator 40 includes a left side applicator 42 and a right side applicator 44. The left side applicator 42 applies a dressing fluid to the sidewalls 46 of the left front tire 48 and the left rear tire 50. The right side applicator 44 applies dressing fluid to the sidewalls 46 of the right front tire 52 and the right rear tire 54. As the vehicle 56 moves along the track 58, the left side applicator 42 and the right side applicator 44 separate to make room for the vehicle 56.

The left side applicator 42 includes a left tire engagement arm 60, a left deflector 62, a pair of left swing arms 64, and a pair of left anchors 66. The left swing arms 64 include first ends 68 and second ends 70. The first ends 68 rotatably attach to the left tire engagement arm 60 at the arm rotation joints 72. The second ends 70 rotatably attach to the anchors 66 at the anchor rotation joints 74. Although the anchors 66 are shown as two structures, it should be appreciated that a single anchor can be provided to fix the location of the second ends 70 in place relative to the track 58.

The right side applicator 44 includes a right tire engagement arm 80, a right deflector 82, a pair of right swing arms 84, and a pair of right anchors 86. The left swing arms 84 include first ends 88 and second ends 90. The first ends 88 rotatably attach to the right tire engagement arm 80 at the rotation joints 92. The second ends 90 rotatably attach to the anchors 86 at the anchor rotation joints 94. The anchors 86 are provided to hold the second ends 90 in place relative to the track 58, and can be provided as a single structure, if desired.

As the vehicle 56 is towed along the track 58 in the direction of the arrow, the left front tire 48 contacts the left deflector 62 and causes the left tire engagement arm 60 to move to create a path for the left front tire 48 and the left rear tire 50 along the inside surface 96 of the left tire engagement arm 60. Similarly, the right front tire 52 contacts the right deflector 82 and causes the right tire engagement arm 80 to move to create a path for the right front tire 52 and the right rear tire 54 along the inside surface 98 of the right tire engagement arm 80. As shown by the relative length of the left swing arms 64 and the right swing arms 84, the right swing arms 84 swing an amount depending upon the width of the vehicle pulled along the track 58. In addition, it should be appreciated that the swing arms 64 and 84 can be biased to a relatively closed position as shown in FIG. 2 so that the front tires 48 and 52 contact the left deflector 62 and the right deflector 82.

A pair of cylinders 100 can be provided to create a desired level of interference or friction between the tire engagement arms 60 and 80 and the vehicle tires. The cylinders 100 can be pneumatic cylinders or hydraulic cylinders. In addition, a left frame structure 102 can be provided for holding the left deflector 62 relative to the left tire engagement arm 60. Similarly, a right frame structure 104 can be provided for holding the right deflector 82 relative to the right tire engagement arm 80.

The left deflector 62 and the right deflector 82 can be provided as rollers or bumpers that can handle the impact created by contact with the vehicle tires. In addition, although the left side applicator 42 and the right side applicator 44 are shown having pairs of swing arms 64 and 84, it should be understood that the left side applicator and the right side applicator can be designed so that each has one swing arm or more than two swing arms. The purpose of the swing arm is to align the tire engagement arms 60 and 80 against the vehicle tires to provide a desired level of pressure against the vehicle tires between the left inside surface 96 and the tire surface 46, and the right inside surface 98 and the tire surface 46.

Now referring to FIGS. 3 and 4, a tire engagement arm according to the principles of the present invention is provided at reference numeral 110. It should be understood that the tire engagement arm 110 can be used as both the left tire engagement arm and the right tire engagement arm. The tire engagement arm 110 includes an applicator manifold 112 having an opening 114 for receiving a tire dressing fluid. The tire dressing fluid can be provided to the opening 114 via a tire fluid dispensing line 116. The applicator manifold 112 includes an interior conduit 118 having a plurality of branch conduits 120 that provide for dispensing the tire dressing fluid through a plurality of openings 122. It should be appreciated that FIG. 4 provides a back side cutaway view of the support 113 showing the applicator manifold 112 internal plumbing. The support 113 is provided for supporting the applicator manifold 112 and the leveling pad 124. The support 113 can be part of the frame structures 102 and 104 shown in FIG. 2, or the support 113 can be an additional structure. In addition, it should be understood that the support can be the same structure as the applicator manifold. For example, a pipe arrangement can function as both the applicator manifold and the support. The applicator manifold refers to the conduits or openings within the pipe arrangement and the support refers to the structure that supports the conduits.

A leveling pad 124 is provided for covering the openings 122. In addition, holes 126 can be provided in the leveling pad 124 that correspond to the holes 122 so that the tire dressing fluid flows out of the holes 122 and through the holes 126 for direct application to a tire surface.

The applicator pad 124 can be any type of pad that allows the tire dressing fluid to flow through the holes 126 and onto the tire surface. In order to provide direct application to the tire surface, the holes 126 should have a diameter that allows the tire dressing fluid to flow therethrough. The diameter of the holes can be at least about 0.05 inch, and can be at least about 0.1 inch. If the holes are too large, control of applying the tire dressing fluid to a tire surface may decrease. The diameter of the holes can be less than about 0.25 inch and can be less than about 0.125 inch.

As shown in FIG. 4, the tire dressing fluid can be provided in a container 128 and then conveyed by a pump 129 through the line 116. The applicator manifold 112 can be provided so that it is flooded with the tire dressing fluid, and valves can be provided in the openings 122 to control flow of the fluid out of the applicator manifold. If valves are not provided in the openings 122, flow of the tire dressing fluid out of the openings 122 can be controlled by controlling the flow of the tire dressing fluid into the applicator manifold 112 by, for example, the pump 129.

Now referring to FIG. 5, an alternative embodiment of the tire engagement arm is provided at reference numeral 130. The tire engagement arm 130 includes an applicator manifold 132 and a leveling pad 134. The applicator manifold 132 includes an opening 136 for receiving the tire dressing fluid and a plurality of openings 138 for dispensing the tire dressing fluid over the tire surface. In the case of the applicator manifold 132, the openings 138 can be considered to be relatively small. The openings 138 can have a size that is sufficiently small to reduce or prevent dripping of the tire dressing fluid therethrough until the applicator manifold 132 is compressed by the tire surface. That is, once the applicator manifold 132 is compressed, the tire dressing fluid can be squeezed out of the openings 138. When the pressure is removed from the applicator manifold 132, the openings 138 can close sufficiently to reduce or prevent the tire dressing fluid from flowing therethrough. It should be understood that the size of the openings depends on the viscosity of the tire dressing fluid and the pressure applied by the tire dressing fluid entering the applicator manifold. In general, the openings can have a diameter that is less than about 0.02 inch.

The applicator manifold 132 can be constructed of a material that is deformable so that as pressure is applied to the applicator manifold 132 by the presence of a tire pressing against the inside surface 139, the applicator manifold 132 compresses causing the tire dressing fluid to dispense out of the plurality of openings 138. Accordingly, as the engagement arm 130 is pushed against the tires of a vehicle, the applicator manifold 132 is compressed causing the tire dressing fluid to flow out of the openings 138 and onto the tire surface. Alternatively, flow out of the openings 138 can be controlled by controlling the flow of the tire dressing fluid into the applicator manifold 132 by, for example, a pump.

The leveling pad 134 is provided as a pair of leveling pads 140 and 142 that are located above and below the applicator manifold 132. The leveling pad 134 assists in leveling and spreading the tire dressing fluid over the surface of the tire to provide a relatively even and consistent application of the tire dressing fluid to the tire surface. Although a pair of leveling pads 140 and 142 are shown, it should be understood that the tire engagement arm 130 can be constructed so that it has only one of the leveling pads 140 and 142.

A support structure 144 can be provided for holding the applicator manifold 132 and the leveling pad 134 in place on the inside surface 146 of the tire engagement arm 130.

Now referring to FIG. 6, an alternative embodiment of the tire engagement arm is provided at reference numeral 145. The tire engagement arm 145 includes an applicator manifold 141 having a plurality of dispensing tubes 147. Each dispensing tube 147 has a plurality of openings 148 similar to the openings 138. Pressure against the dispensing tubes 147 can cause the tire dressing fluid to dispense through the openings 148 and onto the tire surface. In addition, leveling pads 149 can be provided to level and spread the tire dressing fluid over the surface of the tire. In addition, the engagement arm 145 can include a support structure 143 that supports both the applicator manifold 141 and the leveling pad 147.

Now referring to FIGS. 7 and 8, an alternative design of a tire engagement arm is provided at reference numeral 150. The tire engagement arm 150 includes an applicator manifold 152 and a leveling pad 154. The applicator manifold 152 includes an opening 156 for receiving the tire dressing fluid, and a plurality of openings 158 for dispensing the tire dressing fluid to the surface of a tire. Included in the openings 158 are nozzles 160 that provide for a spray application of the tire dressing fluid onto the tire surface. The leveling pad 154 includes openings 162 that are provided having a diameter sufficient to fit the nozzles 160 and the spray pattern generated by the nozzles 160 so that the tire dressing fluid is sprayed onto the tire surface. The leveling pad 154 is sufficiently thick so that the nozzles 160 are not damaged by contact with the tires. The nozzles 160 can include valves that control the spray of the tire dressing fluid through the nozzles. Alternatively, the spray can be controlled by a valve or pump located upstream.

The engagement arm 150 can include a support structure 164 that holds both the applicator manifold 152 and the leveling pad 154 in place.

Now referring to FIG. 9, an alternative design of a tire engagement arm is provided at reference numeral 180. The tire engagement arm 180 includes a first stage 182 having air applicators 184 for providing a blast of air to dry the vehicle tires. The tire engagement arm 180 includes a second stage 186 having tire dressing fluid openings 188 for applying tire dressing fluid to the tire surface. A leveling pad 192 can be provided for spreading the tire dressing fluid across the tire surface. The openings 188 can be the same as or similar to the previously described openings. In addition, the tire engagement arm 180 can include a third stage 190 having a leveling pad 192 for spreading the tire dressing fluid across the tire surface an no openings for applying a dressing fluid to the tire surface. The tire dressing fluid can be supplied to the openings 188 by an applicator manifold 194. In addition, the applicator manifold 194 and the leveling pad 192 can be held in place on the tire engagement arm 180 by a support structure 196.

The leveling pad can be formed of any material that helps spread and level the tire dressing fluid on the surface of a tire. The leveling pad can include a foamed material, a textile or fabric material, and/or a brush material. When the leveling pad is provided as a foam material, the foam material can be a closed cell foam, an open cell foam, or a reticulated foam. In general, a closed cell foam can be preferred when it is desired to reduce or control absorption of the tire dressing fluid into the applicator pad. Exemplary closed cell foams that can be used include foams having desired properties of density, tensile strength, water absorption, and impression resistance. The foams can have a density that is greater than about 1 lb/ft$^3$ and can have a density that is greater than about 2 lb/ft$^3$. The foams can have a tensile strength that is greater than about 20 psi. In addition, the foams can have a tensile strength that is less than about 50 psi. The foams can have a water absorption that is less than about 0.3 lb/ft$^3$, and can have an impression resistance of at least 2 psi and which can be less that about 20 psi. Exemplary polymers that can be used to form the closed cell foams according to the invention include ethylene vinyl acetate polymers, polyvinyl chloride polymers, and polyethylene. An exemplary foam that can be use is available under the name NeoGlide™. When the leveling pad is provided as a textile, it can be provided as a knitted fabric or a woven fabric. When the leveling pad is provided as a brush, it can be provided as a bristle brush, a hog's hair brush, a brush formed from polymer fibers, or a brush formed from strips of polymeric material that may be foamed and may be open cell foams or closed cell foams.

The leveling pad can be provided having cuts or slits in its surface that engages or touches the tire surface to help reduce wear of the leveling pad. In general, it is desirable to provide slits or cuts in the surface of the leveling pad to provide relief so the tires do not pinch the leveling pad. The depth of the slits or cuts and the frequency of the slits or cuts can be sufficient to extend the useful life of the leveling pads. It is desirable to extend the use life of a leveling pad to reduce replacement of the leveling pads. A useful life for the leveling pads is at least about 500 cars per pad and can be as high as at least 2,000 cars per pad.

The leveling pad can be constructed so that it has a size that contributes to leveling and spreading of the tire dressing fluid over the tire surface. In general, the surface of the tire that will receive the tire dressing fluid is the tire sidewall. If the height of the leveling pad is too great, it is expected that tire dressing fluid may be applied to the wheel rims or to the sides of the vehicle. Customers generally do not desire to have the tire dressing fluid applied to the wheel rims or to the body of their vehicles. In addition, if the height of the leveling pad is too small, it is expected that the tire dressing fluid will not be sufficiently spread across the tire surface. An exemplary height is between about 3 to about 4 inches. The thickness of the leveling pad should be sufficient to protect the applicator manifold from damage. If there are valves and/or nozzles on the openings of the applicator manifold, the thickness of the leveling pads should be sufficiently large that the tires do not contact or damage the valves or nozzles. Because the sidewalls of tires are often provided at an angle, the thickness of the leveling pads should be sufficient so that the level pad contacts the entire sidewall. An exemplary thickness for the leveling pads is at least about 2 inches with the understanding that the leveling pads will compress to conform to the tire sidewalls.

It is believed that a desired level of control of dispensing the tire dressing fluid can be achieved without having the tire dressing fluid first absorbed or sprayed onto a substrate that is then used to apply the tire dressing fluid to the tire surface. That is, the present invention can avoid having the tire dressing fluid applied to the back side of an open cell or reticulated foam and having the fluid pass through the foam to the front side for application to the tire surface. In addition, the invention can avoid having to apply the tire dressing fluid to a substrate in a first position that is then rotated to a second position to apply the fluid to the tire surface. Instead, the tire dressing fluid can be applied directly to the tire surface and the leveling pad can be used to help spread and level the tire dressing fluid across the tire surface. It should be understood that the phrase "direct application" of the tire dressing fluid to the tire surface includes allowing the fluid to pass through holes created in the leveling pad to provide flow of the fluid from the applicator manifold to the tire surface.

The applicator manifold should be constructed of a material that allows it to perform its intended function. In the situation where the applicator manifold is intended to be a relatively rigid structure that withstands impacts created between the tire engagement arm and the tires on motor vehicles processed through the washing facility, the applicator manifold can be formed from a metal material or a relatively rigid plastic material. In the situation where the applicator manifold is intended to deform when it is pushed against the tires of a vehicle, the applicator manifold can be manufactured from a flexible material, such as flexible plastic.

The tire dressing fluid can be any composition that imparts a shine or gloss to a tire surface. Exemplary tire dressing fluids include silicone containing fluids. The silicone containing fluids can be water based or non-water based. An exemplary tire dressing fluid is available under the name Black Magic® Tire Wet® Gel.

Figure 12:
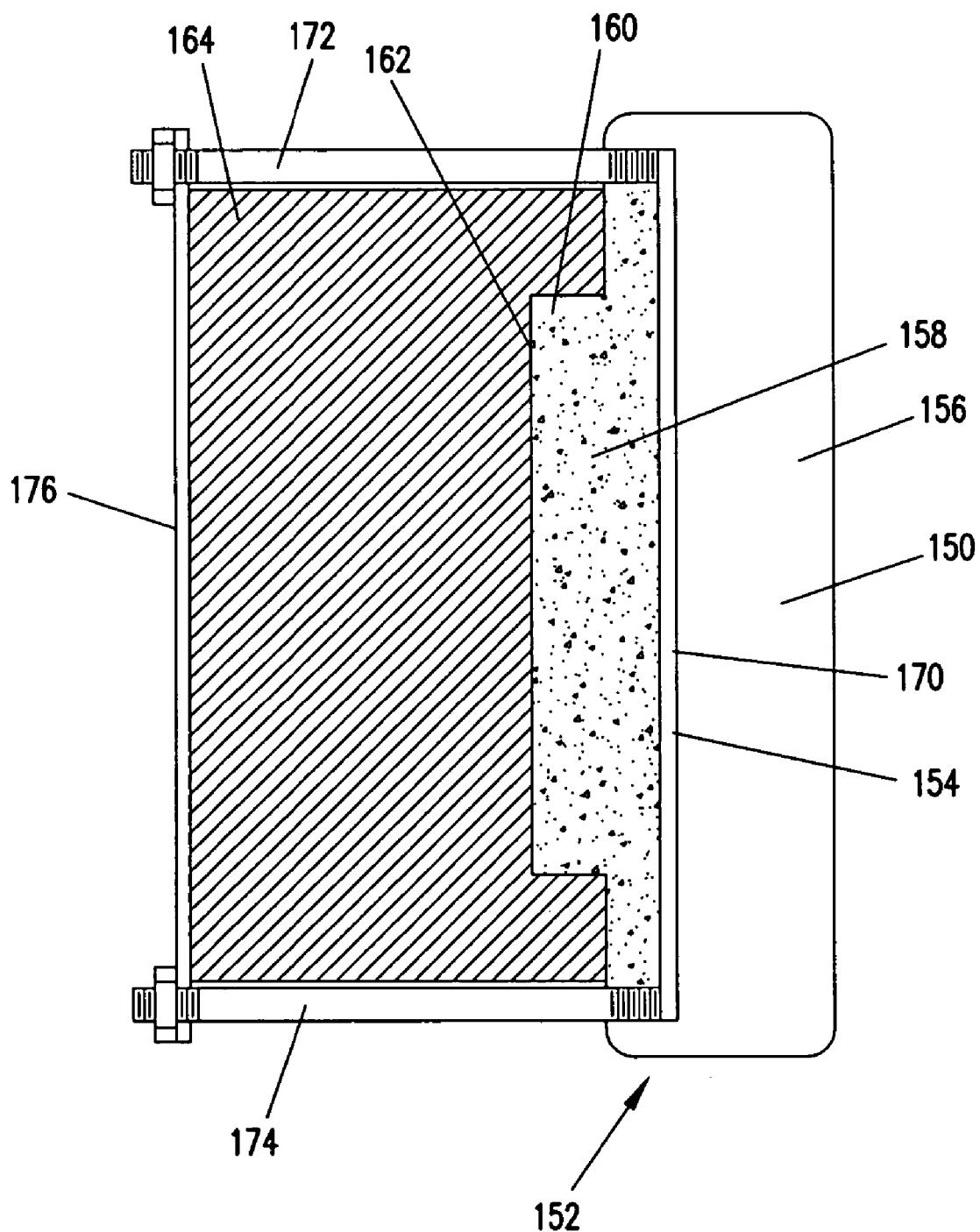
FIG. 12 is a diagrammatic view showing an exemplary technique for attaching the leveling pad in place on the tire engagement arm.
Figure 13:
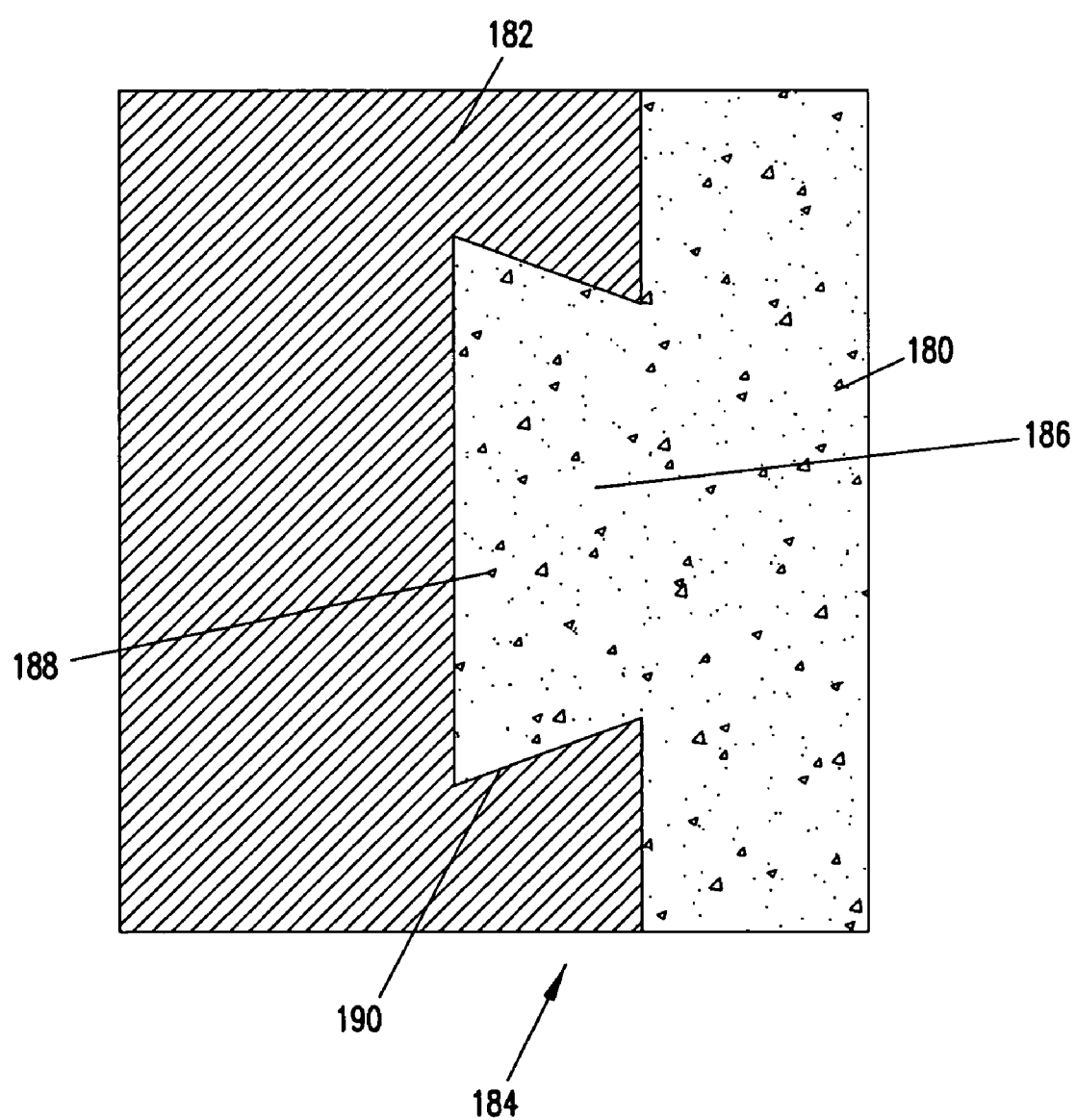
FIG. 13 is a diagrammatic view showing an exemplary technique for attaching the leveling pad in place on the tire engagement arm.
Figure 14:
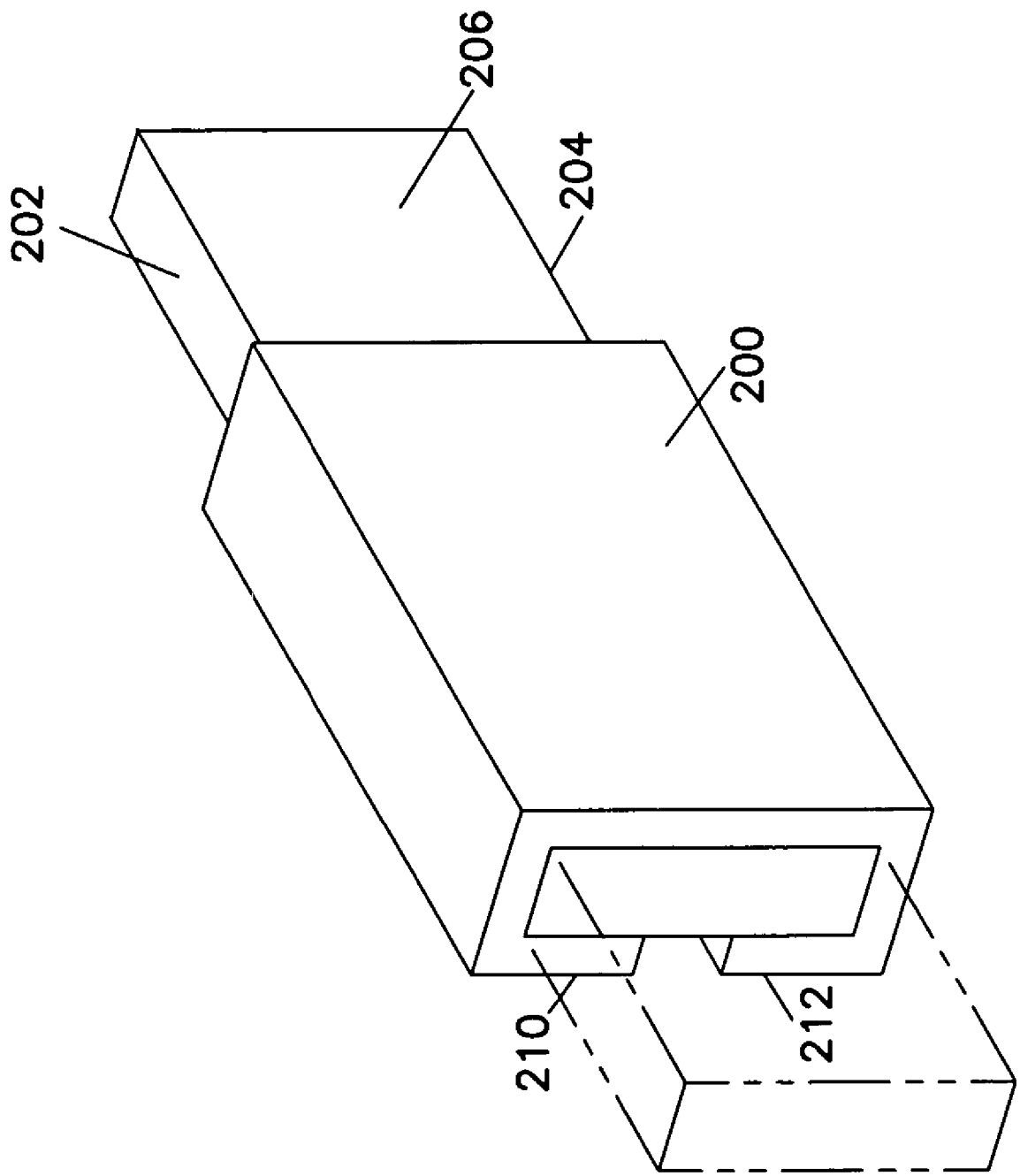
FIG. 14 is diagrammatic view showing an exemplary technique for attaching the leveling pad in place on the tire engagement arm.
Figure 15:
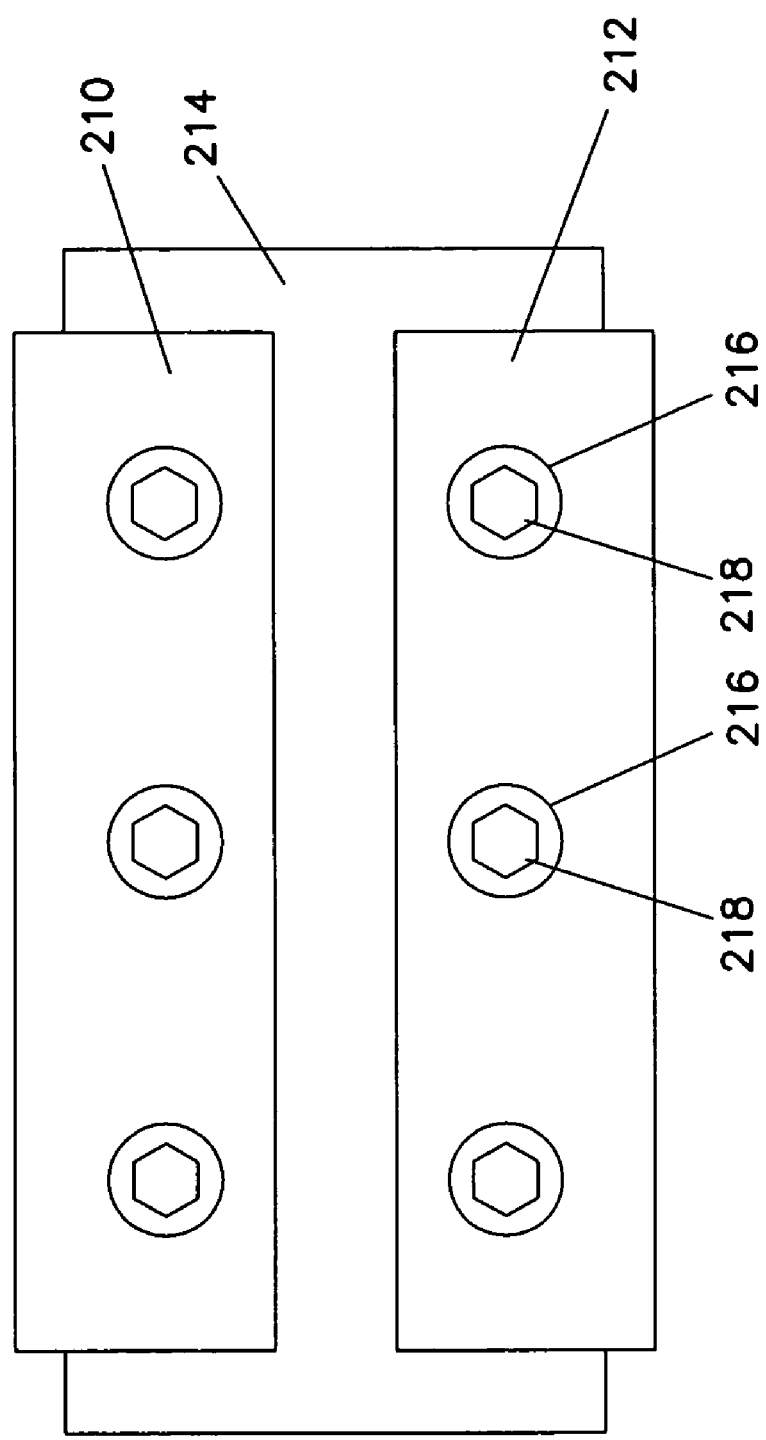
FIG. 15 is a back side view of the tire engagement arm shown in FIG. 14.

FIGS. 10-15 show exemplary designs for attaching the leveling pad to the tire engagement arm and, more particularly, to the support component of the tire engagement arm. It should be understood that FIGS. 10-13 show sectional views and FIGS. 14 and 15 show perspective and back side views that demonstrate techniques for attaching the leveling pad to the tire engagement arm. The attachment mechanism shown can be extended the entire length of the engagement arm or it can be provided at discrete locations along the length of the engagement arm.

Figure 10:
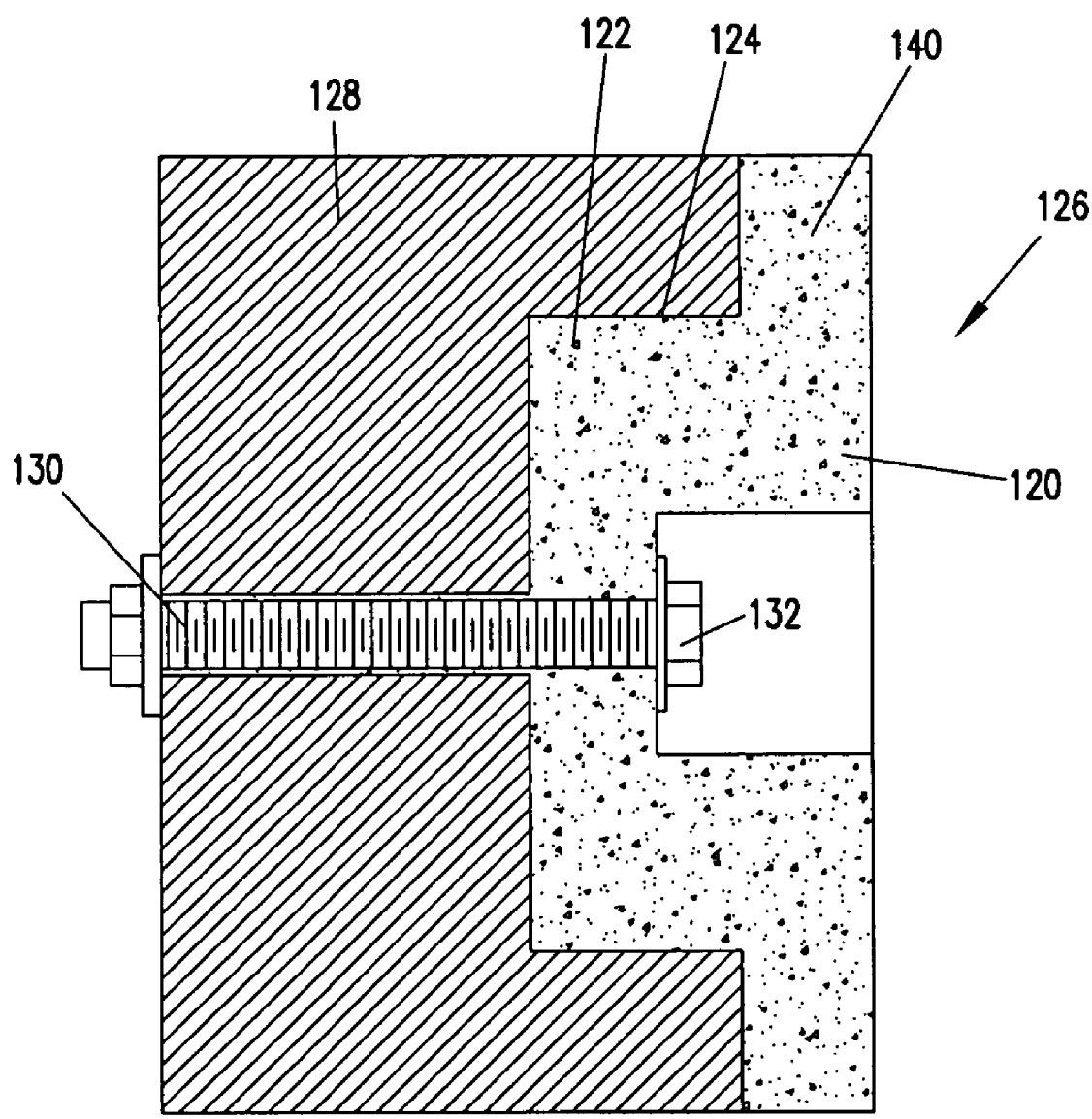
FIG. 10 is a diagrammatic view showing an exemplary technique for attaching the leveling pad in place on the tire engagement arm.
Figure 11:
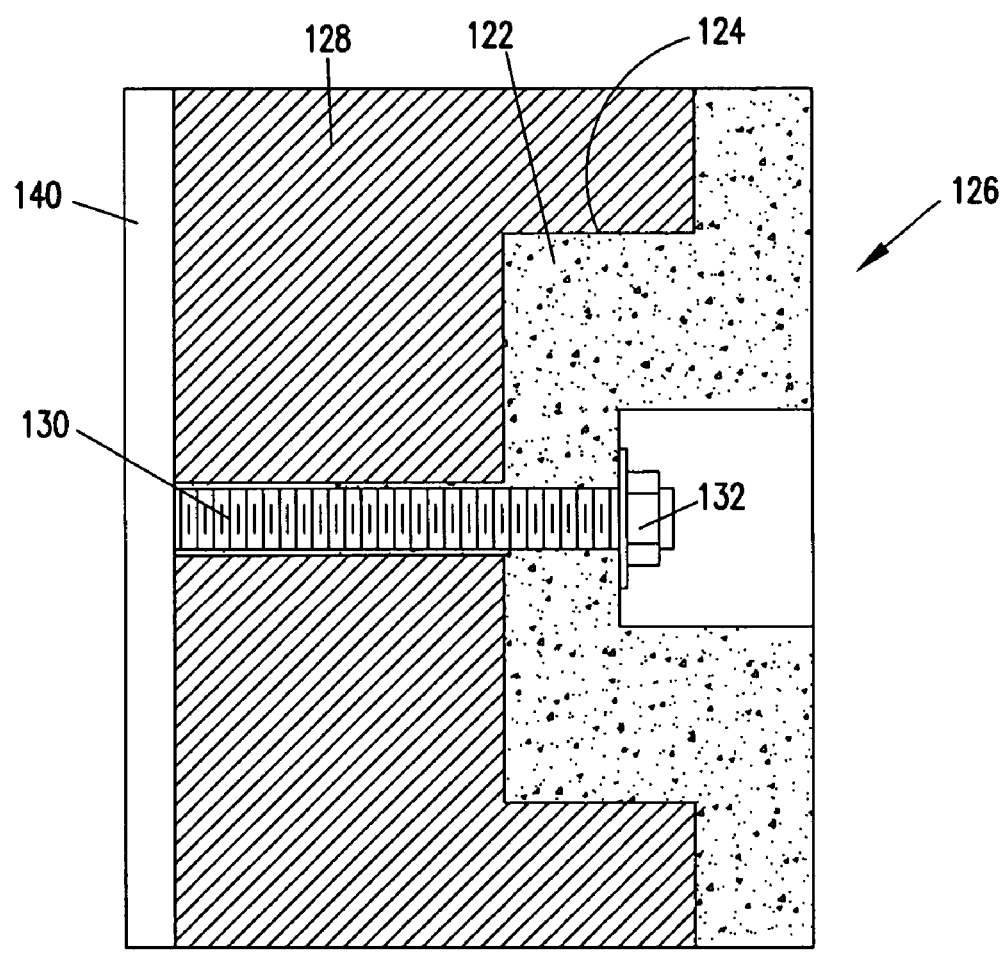
FIG. 11 is a diagrammatic view showing an exemplary technique for attaching the leveling pad in place on the tire engagement arm.

Now referring to FIG. 10, the leveling pad 120 is provided with a tongue 122 that fits within a slot 124 provided along the inside face 126 of the support 128. A bolt 130 can be used to hold the leveling pad 120 to the support 128. The bolt end 132 facing the inside face 126 can be recessed into the leveling pad 120 so that it does not contact the tire surface. FIG. 11 shows a construction similar to FIG. 10 except that the bolt 130 is attached to a back plate 140. The back plate 140 can be provided so that it extends the height of the support 128.

Now referring to FIG. 12, a leveling pad 150 can be provided having a slit or opening 152 that allows for insertion of a bracket 154 between an exterior component 156 and an interior component 158 of the leveling pad 150. The interior component 158 can be provided having a tongue 160 that fits within a groove 162 of the support 164. In addition, the bracket 154 can include a face member 170 that fits within the opening 152 and includes extensions 172 and 174 that allow it to be fastened to the support 164. The extensions 172 and 174 can have bolt-type fasteners that fasten to the support 164 or a back plate 176. In addition, the supports 172 and 174 can be clamped in place, if desired, instead of bolted in place.

Now referring to FIG. 13, the leveling pad 180 can be attached to the support 182 by a dovetail arrangement 184. In general, the back side 186 of the leveling pad 180 can be provided with a structure 188 that allows it to be fitted within a corresponding structure 190 of the support 182 that restricts movement of the applicator pad 186 away from the support 182. The leveling pad 180 can be removed from the support 182 by sliding it along a length of the support 182.

FIG. 14 shows an arrangement where the leveling pad 200 wraps around the top 202 and bottom 204 of the support 206. In addition, the leveling pad 200 can include back wrapping members 210 and 212 that wrap to the back side 214 of the support 206. As shown in FIG. 15, the back portions 210 and 212 can be fastened to the back side 214 by fasteners 216. The fasteners can be bolts 218. In addition, the fastener can be a clamp or a belt, or adhesive.

Figure 16:
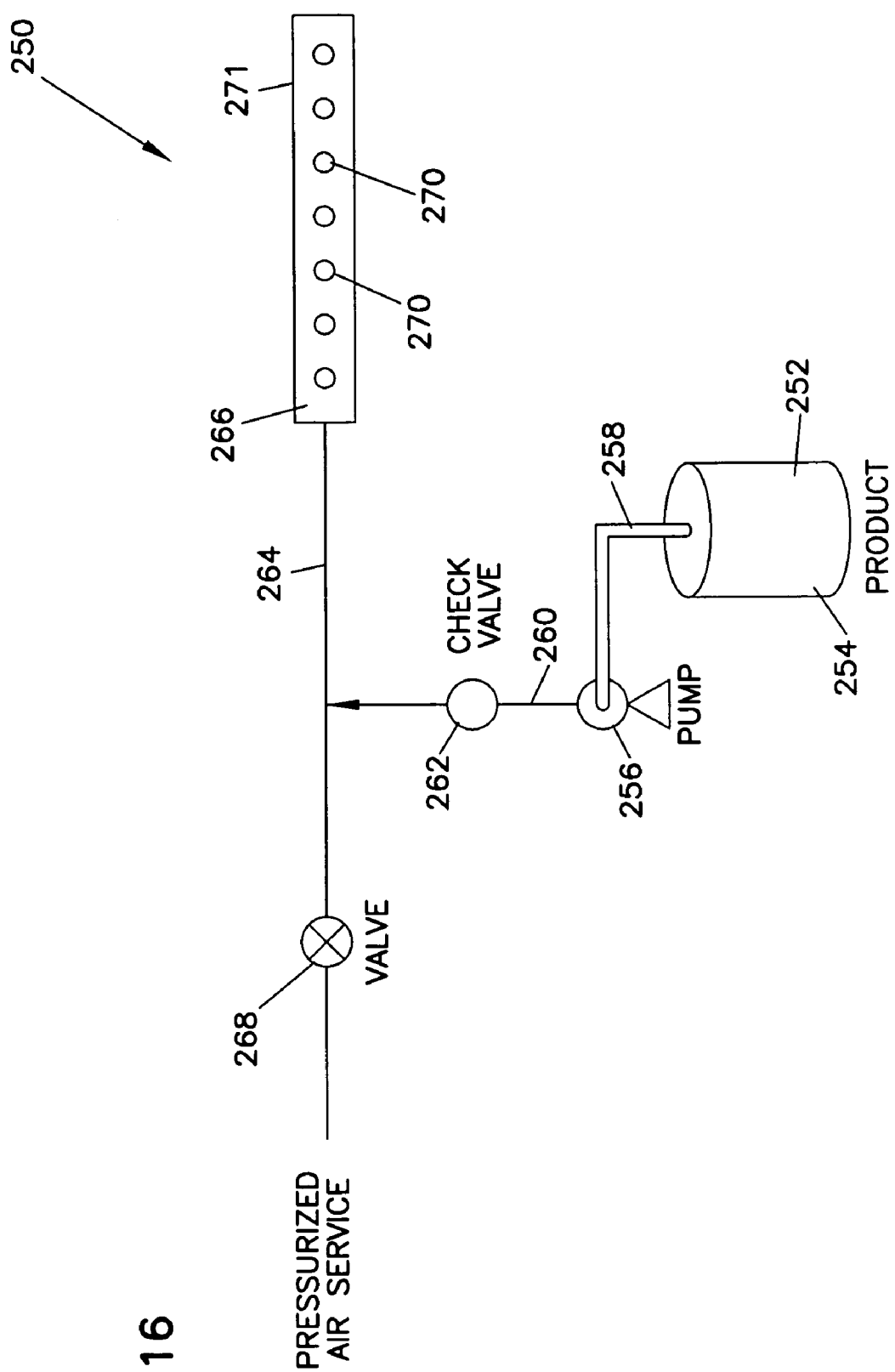
FIG. 16 is a diagrammatic view of an alternative arrangement for delivering tire dressing fluid to a tire dressing delivery member according to the principles of the present invention.

Now referring to FIG. 16, an arrangement for delivering fluid to a tire surface is shown at reference numeral 250. The fluid 252 such as a tire dressing fluid can be provided within a product container 254. A pump 256 can be used to pump the fluid 252 from the product container 254 through the product line 258 and into a fluid delivery line 260. A check valve 262 can be provided in the fluid delivery line 260 to prevent back flow.

A pressurized line 264 can be provided to deliver fluid, under pressure, to the applicator manifold 266. The pressurized line 264 can be pressurized by air pressure. A valve 268 can be provided for controlling pressurized air flow through the pressurized line 264.

A spray of fluid can be provided through the openings 270 in the applicator manifold 266 for delivery onto a tire surface. The spray can be controlled by a valve or valves within the applicator manifold 266 or along the pressurized line 264 and/or by the valve 268. It should be understood that if valves 268 and 262 are closed, the pressure within the pressurized line 264 may be allowed to reach atmospheric pressure.

Air-assisted delivery of fluid onto a tire surface can provide delivery of fluid using less product and can provide a more even application of fluid over the tire surface, and provide a cleaner operating system. By blowing air through the pressurized line 264, fluid remaining in the line can be blown out. In addition, the air flow can be used to blow excess water off the tire surface and/or to help level the fluid on the tire.

An exemplary technique for operating an air-assisted delivery can include opening the air valve 268 and allowing air to flow through the openings 270 to help dry the tire surface. The pump 256 can be used to inject the fluid into the pressurized line 264 to effect air-assisted delivery of the fluid onto the tire surface. Continued flow through the pressurized line 264 can help evacuate the fluid from the pressurized line 264, and the air flow over the tire surface can help level the fluid. The valve 268 can close and remain closed until it is time to apply fluid to another tire surface.

The applicator manifold 266 is provided as part of a tire dressing delivery member 271. In general, the tire dressing delivery member 271 refers to the structure that delivers the tire dressing fluid to a tire surface and can be referred to as a tire dressing engagement arm when it includes a leveling pad to help level the tire dressing fluid on the tire surface. It should be appreciated that the tire dressing delivery member 271 may or may not include a leveling pad.

Figure 17:
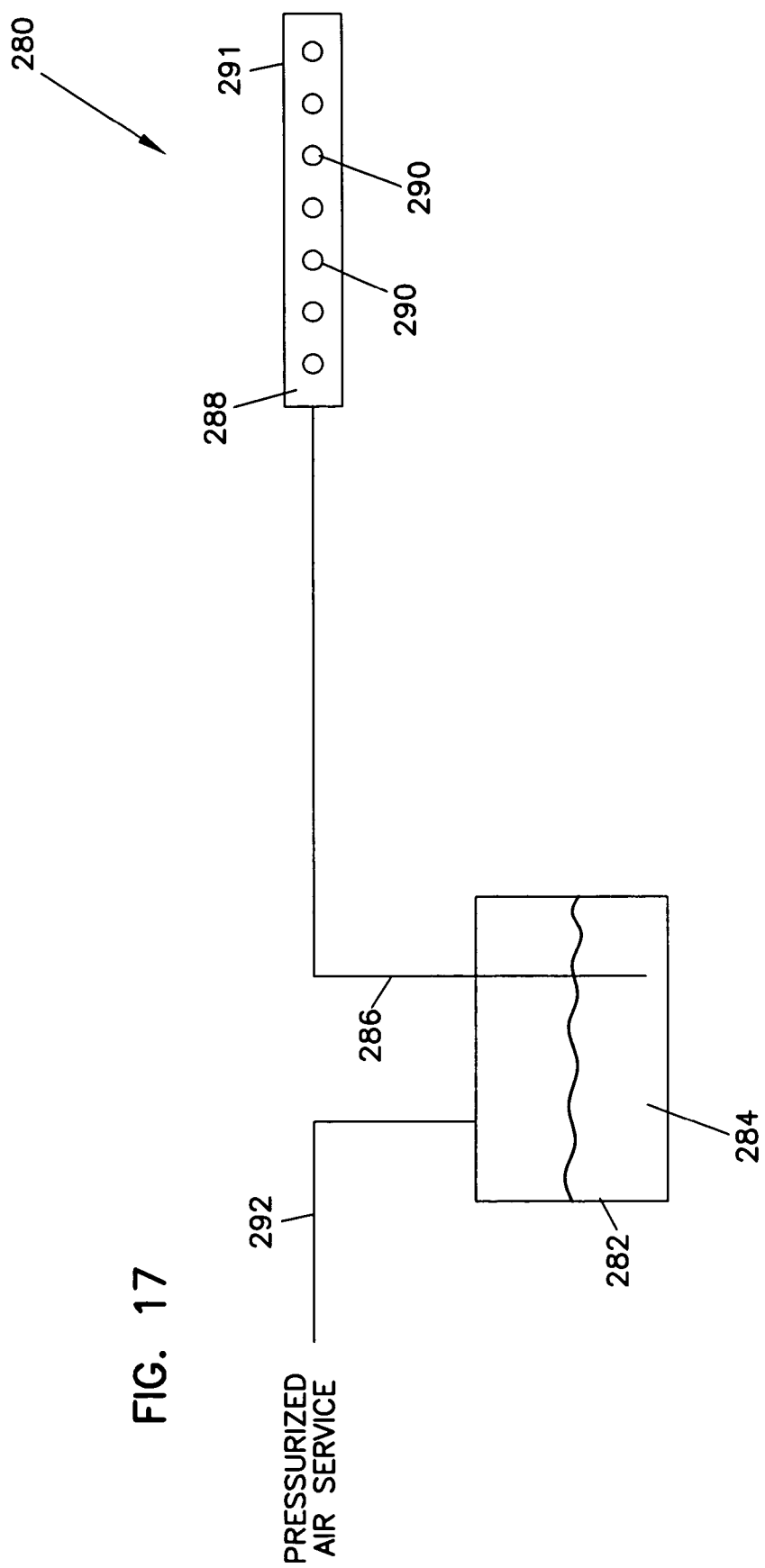
FIG. 17 is a diagrammatic view of an alternative arrangement for delivering tire dressing fluid to a tire dressing delivery member according to the principles of the present invention.

Now referring to FIG. 17, an alternative arrangement for delivering fluid to a tire surface is shown at reference numeral 280. A tank 282 can be provided containing a fluid 284 such as a tire dressing fluid. A fluid delivery line 286 can be provided for delivering the fluid to the applicator manifold 288 and out the openings 290. A pressurized air line 292 can be connected to the tank 282 to pressurize the tank 282 and cause the fluid 284 to flow through the fluid delivery line 286. Valves can be provided within the fluid delivery line 286 and/or the applicator manifold 288 to control the delivery of fluid onto a tire surface. The pressurized air can be used to help deliver fluid to the applicator manifold 288 and apply the fluid as a spray or stream onto the tire surface. The applicator manifold 288 can be provided as part of a tire dressing delivery member 291. Leveling pads may or may not be present on the tire dressing delivery member 291. In general, it is expected that leveling pads may be omitted if the spray created by the applicator manifold 288 is sufficient to provide a desired coating of tire dressing fluid on the tire surface without the need for a leveling pad.

The pressurized air line 292 can be used in place of the pump 256 in the arrangement 250 in FIG. 16. For example, the pressurized air line 292 can be used to deliver the fluid 284 via the fluid delivery line 286 into the pressurized line 264. A valve can be provided within the fluid delivery line 286 to control the flow of the fluid 284 into the pressurized line 264.

Figure 18:
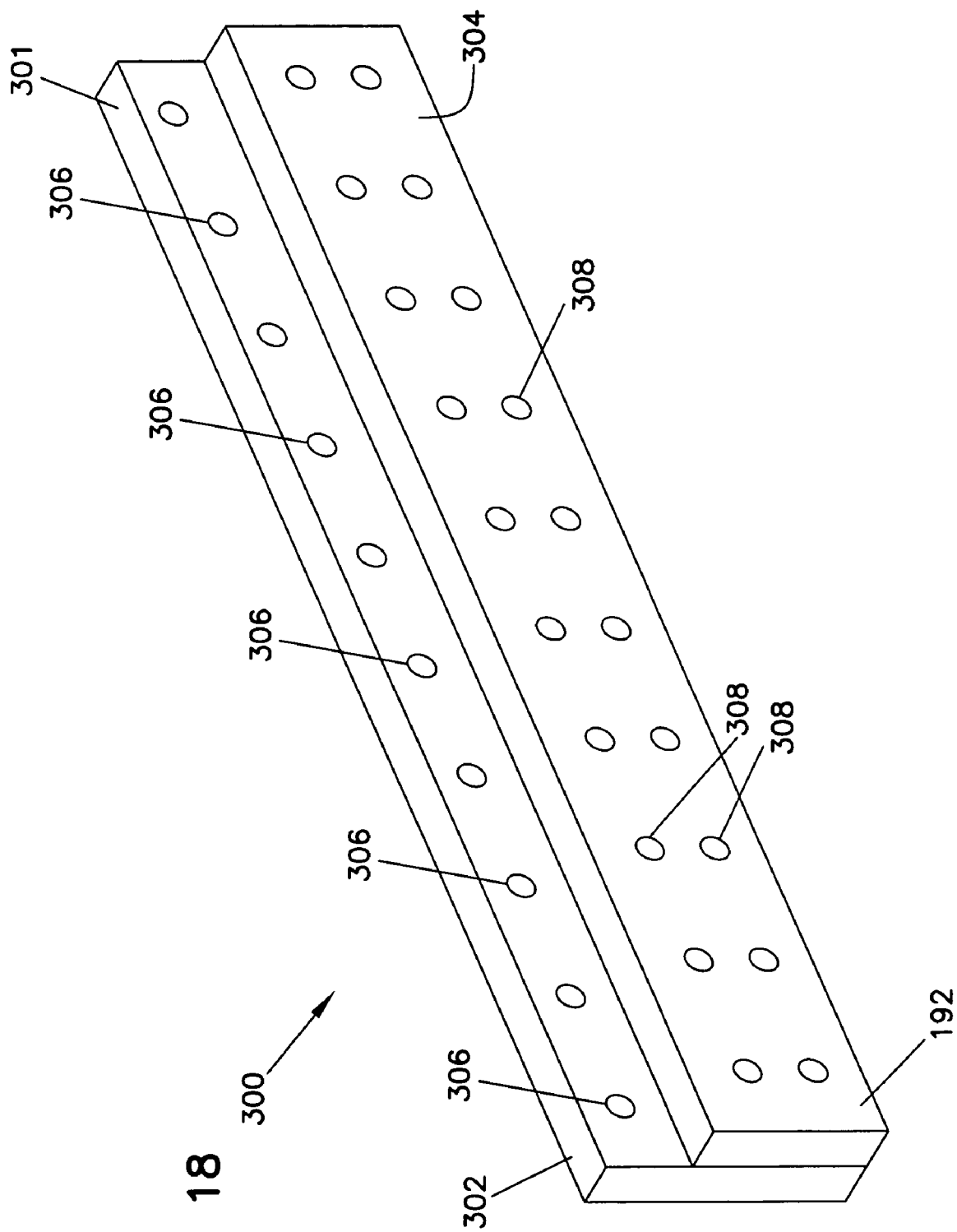
FIG. 18 is a diagrammatic view of an alternative embodiment of a tire dressing delivery member according to the principles of the present invention.

Now referring to FIG. 18, an alternative design of a tire engagement arm is shown at reference numeral 300. The tire engagement arm 300 can be referred to as a tire dressing delivery member 301. The tire engagement arm 300 includes an applicator manifold 302 and a leveling pad 304. Air nozzles 306 are provided for delivering air to a tire surface for drying. Fluid delivery nozzles 308 are provided for delivering fluid such tire dressing fluid to a tire surface.

When the tire dressing fluid is applied to a tire as a result of the tire rolling past the tire dressing applicator, the tire dressing applicator generally needs to have a length of about 8 feet. That is, the space in a vehicle washing facility provided for applying a tire dressing fluid to a tire can be about 8 feet. The reason for this is that the circumference of a tire is about 8 feet and to apply the tire dressing fluid as a result of the rotation of the tire, a length equivalent to the circumference of the tire is generally needed. In facilities where 8 feet of line length is not available, tire dressing fluid can be applied to tires by an alternative technique. The tire dressing fluid can be sprayed onto the exterior surface of the tire. In order to avoid having tire dressing fluid adhere to the wheel, a release agent can be applied to the wheel, the tire dressing fluid can be applied over the wheel and the tire, and a rinse (such as water) can be applied to remove the release agent from the wheel. The release agent can function as a blocking agent to prevent the tire dressing fluid from contacting the wheel. The release agent can be a composition that includes a detergent and a solvent. It is expected that an anionic surfactant can be useful for providing a foaming detergent.

Figure 19A:
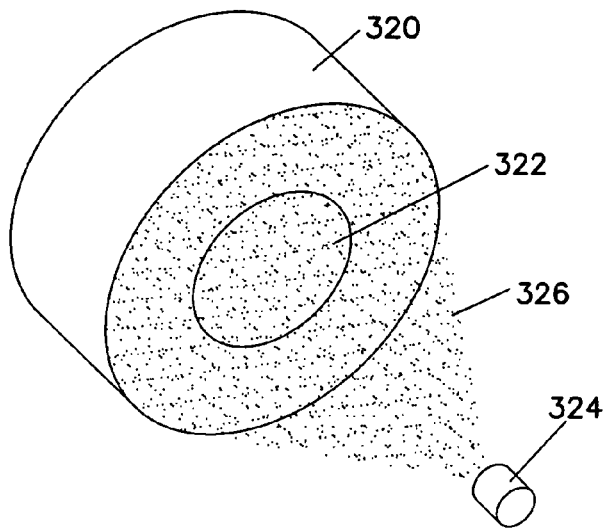
FIG. 19 is a diagrammatic view showing various spray nozzle arrangements for delivering various fluids.
Figure 19B:
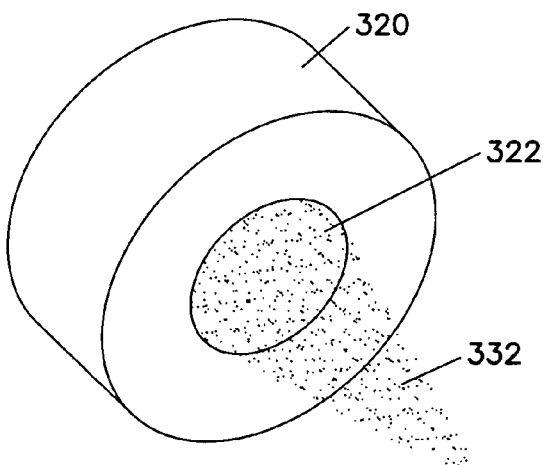
Figure 19C:
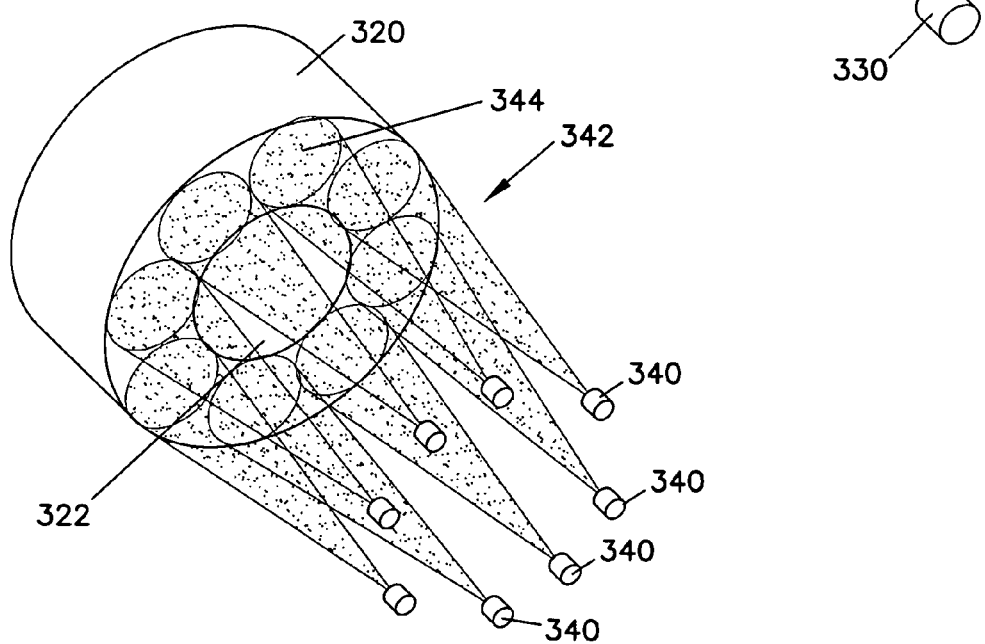

Now referring to FIGS. 19A-C, various spray nozzle arrangements are shown for delivering fluid to a vehicle tire 320 and/or a vehicle wheel 322. The nozzle 324 can be provided for directing a spray 326 onto the tire 320 and the wheel 322. The nozzle 330 can be provided for directing a spray 332 onto the wheel 322. The plurality of nozzles 340 can be arranged to provide a spray pattern 342 that covers the tire surface 344 but not the wheel 322.

The nozzle arrangement 330 can be provided for directing a release agent to the wheel 322. A tire dressing fluid can be applied by either the valve arrangement 324 or the valve arrangement 340. A rinse spray, such as water, can be applied to remove the release agent using the valve arrangement 324 or the valve arrangement 330.

It is expected that the valve arrangements provided in FIGS. 19A-C can be activated in response to a trigger that senses the presence of the tire and wheel within the spray area. An exemplary trigger includes an electronic eye.

It is expected that a release agent applicator can be avoided if the spray from the tire dressing fluid applicator is constructed so that it applies the tire dressing fluid to the tire surface without application to the wheel. It is expected that this type of arrangement can be provided by providing multiple spray nozzles in a pattern so that the spray from each nozzle is directed to the tire surface without having spray directed to the wheel. An exemplary arrangement is shown in FIG. 19C.

The above specification provides a complete description of the apparatus and method of the invention. Since many embodiments of the invention can be made without departing from the spirit and scope of the invention, the invention resides in the claims hereinafter appended.

We claim:

1. An apparatus for applying a tire dressing fluid to a tire surface, the apparatus comprising:
    (a) a source of the tire dressing fluid for application to the tire surface on a motor vehicle to provide the tire surface with a shiny appearance;
    (b) an applicator manifold anchored in place in an automated vehicle washing facility, the applicator manifold having an opening for receiving the tire dressing fluid and a plurality of openings for dispensing the tire dressing fluid directly onto the tire surface;
    (c) a compressed air line in fluid communication with the applicator manifold;
    (d) a pump for delivering the tire dressing fluid from the source of the tire dressing fluid to the compressed air line to provide a compressed air and tire dressing fluid mixture and for providing an air-assisted spray of the tire dressing fluid directly onto the tire surface;
    (e) a valve for controlling the flow of the compressed air and tire dressing fluid mixture; and
    (f) a leveling pad for engaging the tire surface and spreading the tire dressing fluid over the tire surface.

2. An apparatus according to claim 1, wherein the plurality of openings are arranged in a pattern to apply the tire dressing fluid to the tire surface.

3. An apparatus according to claim 1, wherein the tire dressing fluid comprises silicone containing fluid.

4. An apparatus according to claim 3, wherein the silicone containing fluid comprises a water based silicone containing fluid.

5. An apparatus according to claim 3, wherein the silicone containing fluid comprises a non-water based silicone containing fluid.

6. An apparatus according to claim 1, wherein the plurality of openings are constructed to apply the tire dressing fluid directly onto the tire surface of a tire and not onto a wheel holding the tire.

\* \* \* \* \*